Nov. 10, 1959
S. G. FRANKLIN
2,911,881
PHOTOELECTRIC SYSTEMS
Filed Oct. 15, 1956
2 Sheets-Sheet 1
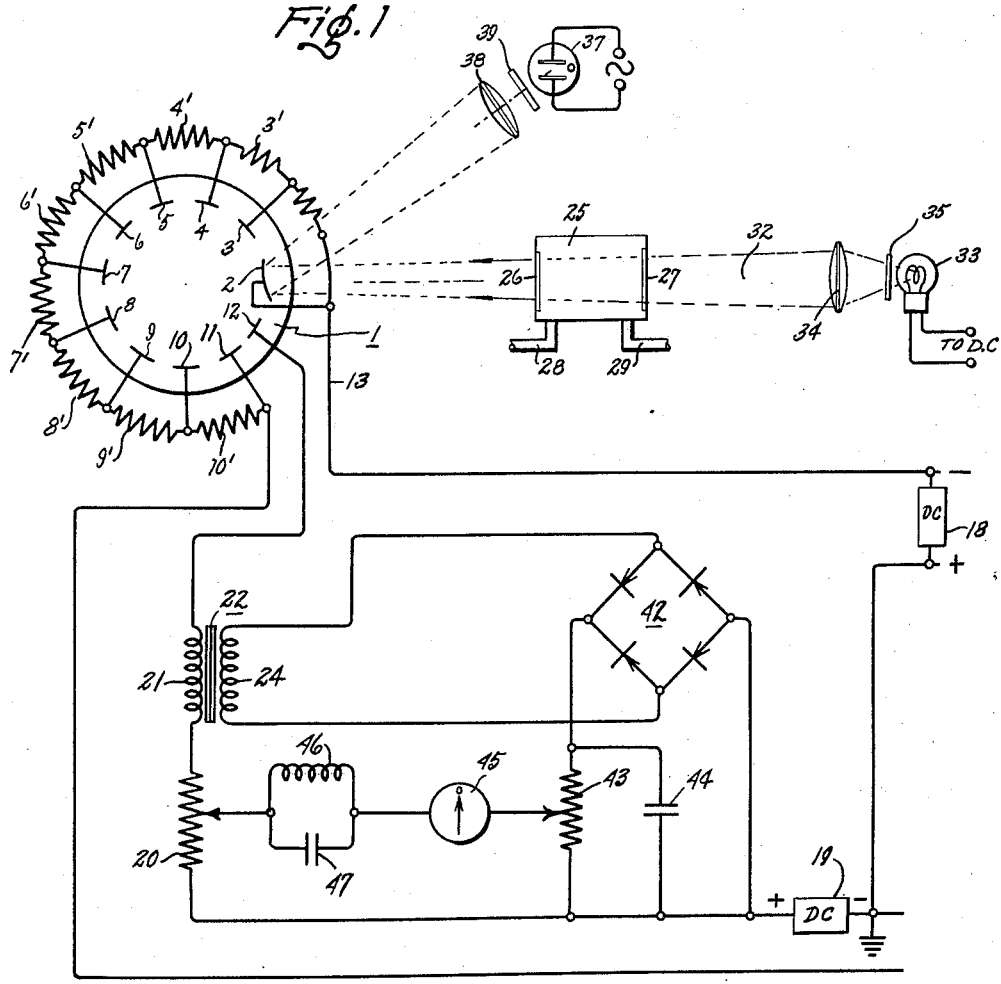
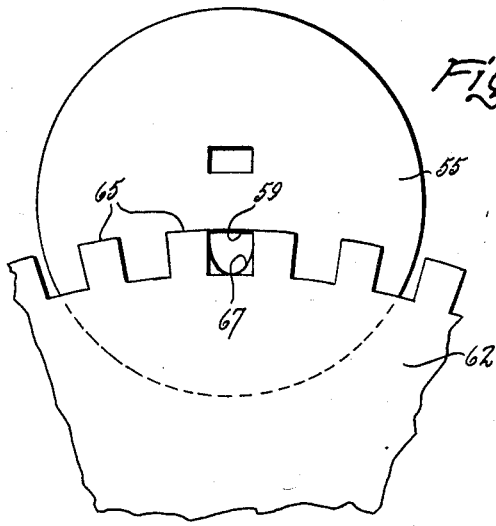
Inventor:
Sandford G. Franklin,
by Merton D. Moore
His Attorney

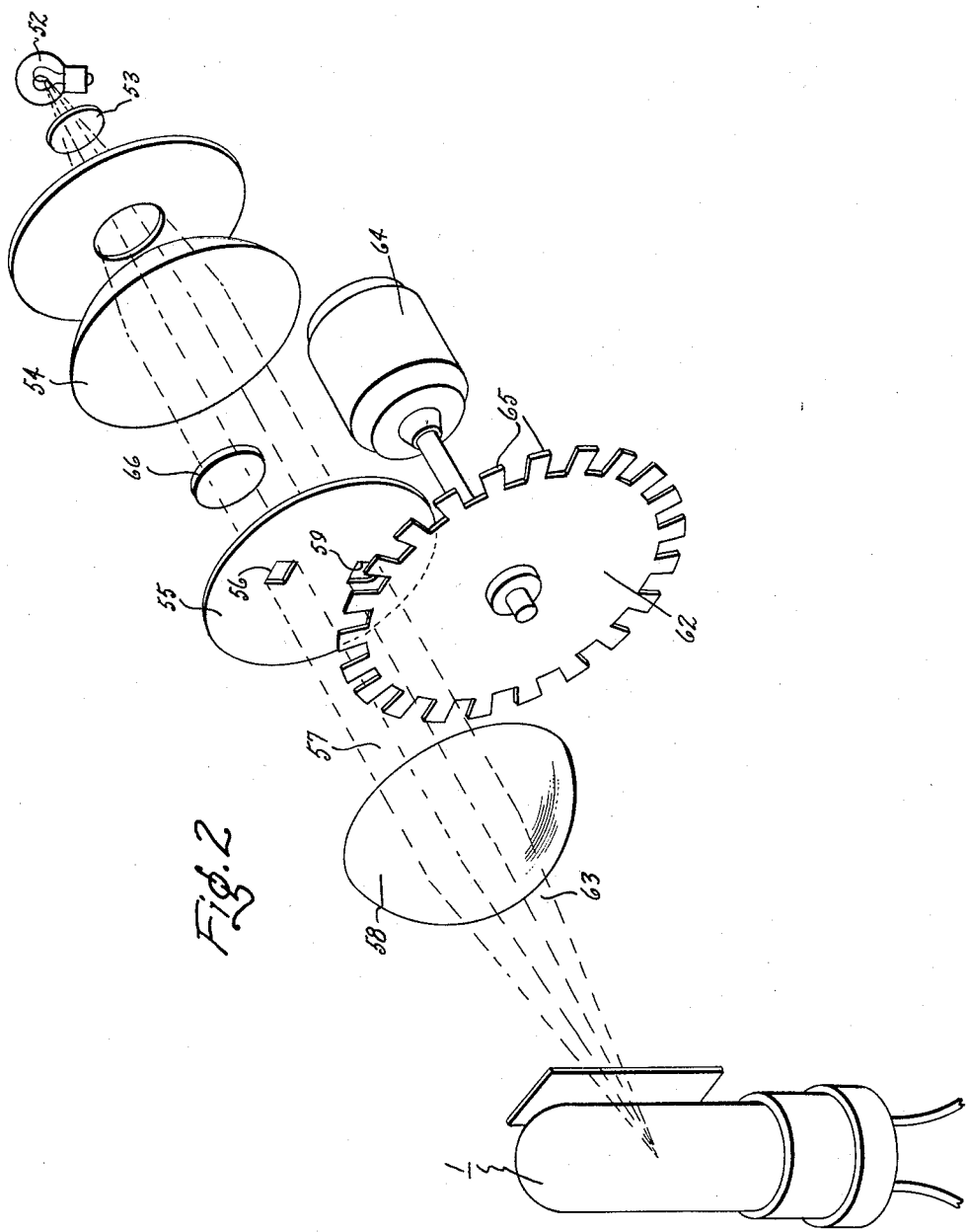

United States Patent Office 2,911,881
Patented Nov. 10, 1959

2,911,881

PHOTOELECTRIC SYSTEMS

Sandford G. Franklin, Ballston Lake, N.Y., assignor to General Electric Company, a corporation of New York Application October 15, 1956, Serial No. 616,011

5 Claims. (Cl. 88—14)

My invention relates to photoelectric systems in which a photoelectric device is utilized for detecting, monitoring, or measuring light variations. Systems employing such devices are commonly utilized to detect, monitor, or measure variations; for example, in the light transmission, or reflection, property of solids, liquids, or gases.

An object of my invention is to provide a system employing such a photoelectric device and in which a response is produced in accord with the quantity to be determined and which response is unaffected by variations in sensitivity of the photoelectric device.

The sensitivity of photoelectric devices such as those of the vacuum, and electron multiplier, type is affected by extraneous effects such as variations in applied operating potential, deterioration, fatigue of the cathode, temperature, etc. Where the photoelectric system is employed to measure, monitor, or detect variations in light, or light transmission, it is highly desirable that the indications obtained be not affected by such extraneous effects.

An object of my invention is to reduce, or eliminate, the influence of such extraneous effects upon the indication, or response, produced by the system.

Another object of my invention is to provide such a system which employs but a single photoelectric device, is simple in its circuit structure, and economical and practical to manufacture and to use.

In accord with my invention, the photoelectric device is subjected to light to be measured, or detected, and the intensity of which determines the quantity to be determined. It is also subjected to light bearing predetermined modulations. Of course, the variations and modulations are reproduced in the output circuit as current variations. The predetermined variations are separated from the output current and utilized to apply an electromotive force varying with the intensity of the modulations to an indicating, or current responsive, device. This electromotive force may be considered as a standard, or reference, electromotive force. The balance of the output current is utilized to apply a second electromotive force to the indicating device in opposite sense to the reference electromotive force. Since the reference electromotive force is normally constant, the indicating device indicates the quantity to be determined.

Since both electromotive forces vary with the extraneous effects, the variations produced by such effects tend to neutralize, or oppose, each other. Thus, the response, or indication, of the current responsive device is controlled solely by the variations which are indicative of the quantity to be determined.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which Fig. 1 shows an embodiment of my invention,
Fig. 2 shows a modification thereof, and
Fig. 3 shows a detail of the modification shown in Fig. 2.

Referring to Fig. 1 of the drawings, I have illustrated therein at 1 a photoelectric device of the electron multiplier type having a photoelectric cathode 2 which, when light falls thereon, emits electrons which fall upon an anode sector 3. This anode sector emits secondary electrons in quantity greater than the primary electrons which fall upon it. The secondary electrons fall upon anode sector 4, this process repeating about the anode sectors 5, 6, 7, 8, 9, 10, 11, and the electron collector 12. A source of unidirectional operating potential 18 has its negative terminal connected to the cathode 2 and its positive terminal connected through a second source of unidirectional potential 19 and load circuit comprising a potentiometer 20 and primary winding 21 of a transformer 22 to the electron collector 12. The two sources of potential 18 and 19 are poled in aiding relation. The various anode sectors, or dynodes, 3–12 are connected to respective points between resistors 3', 4', and 5'–10' throughout the series of anode sectors, as illustrated, and the anode sector 11 adjacent collector 12 is connected to the negative terminal of a second source of potential 19. Thus, the anode 12 is more positive than dynode 11 and the other dynodes are at succeedingly lower operating potentials.

When light falls upon the cathode 2, electrons emitted therefrom fall upon the anode sector 3 producing secondary electrons which fall upon anode sector 4 and so on about the succession of anode sectors, each anode sector emitting more electrons than it receives with the result that the number of electrons increases with each succeeding anode, and large response to the light is provided in the output circuit connected to collector 12.

The rectangle 25 represents a vessel having transparent ends 26 and 27, which may be of quartz, and having an inlet pipe 28 and an outlet pipe 29 by which fluid, liquid, or gas, the light transmission characteristic of which is to be determined, may be caused to flow through the vessel. This vessel may be placed in the path 32 of light between a source 33 and the cathode 2. This light may be produced by a suitable incandescent lamp energized by a source of unidirectional electromotive force indicated by the legend "To D.C." Lens 34, in the path of the light, serves to collimate the light into a concentrated path through the vessel 25 toward the cathode 2. Where it is desired that the light be of restricted character, as, for example, of the frequencies of a particular color, a monochromatic filter 35 may be used in the path of the light between the source of light and the cathode 2, but preferably between the filter 35 and the source 33.

In this way light falling upon the cathode 2 varies with the light transmitting property of the liquid, or gas, within the vessel 25 thereby to vary the current flowing in the output circuit 20—21 of the electron multiplier device.

In accord with my invention, a second source of light 37, which may be that produced by an argon, or neon, lamp, energized from a source of alternating current, is projected upon the cathode 2 through a collimating, or condensing, lens 38. Monochromatic filter 39 is also inserted in the path of the light in order that light falling upon the cathode from the source 37 shall be of the same character as light from the source 33 passing through filter 35 to the cathode. Since the operating electromotive force applied to the device 37 is alternating in character, this device is conducting only for a fraction of each half cycle and, thus, the light produced thereby is produced in pulses rather than constantly as the light from the lamp 33 which is energized by direct current. Accordingly, current in the output circuit 20—21 is varied both in accord with the transmission property of the fluid in the vessel 25 and also in accord with the light pulses from the source 37.

Current variations produced by these light pulses induce alternating electromotive force in secondary winding 24 of transformer 22, which is supplied to a conventional rectifier 42 whereby it is rectified to produce a potential across a potentiometer 43. A capacitor 44 is connected in parallel with the potentiometer 43 to smooth out the pulsating variations and to produce a relatively smooth unidirectional electromotive force across resistance 43.

Variations produced by the variations within vessel 25 are of less rapid character and are not passed by transformer 22 into winding 24 and thus do not affect the voltage on resistance 43 but do affect the potential on potentiometer 20. A suitable indicating instrument, or other current responsive device, 45 is connected between a variable tap on resistance 43 and a variable tap on resistance 20 so that it responds to the differences in voltages between the two variable taps relative to the potential of the lower terminal of the potentiometers.

A filter, comprising an inductance 46 and a capacitance 47 in parallel and resonant at the frequency of the light pulsations from source 37, is preferably connected in series with the instrument 45 effectively to isolate instrument 45 from any alternating electromotive force that may appear on resistance 20.

With the circuit as thus described, the electromotive forces on those portions of potentiometers 20 and 43 below the taps thereon, as illustrated on the drawings, are applied to instrument 45 in opposed sense. The voltage on resistance 43 is normally constant, being produced by rectification and smoothing of voltage responsive to source 37, which is energized from a constant source of alternating current. Thus, this voltage on resistance 43 may be considered to be a standard, or reference, voltage against which the voltage on resistance 20 may be compared. It, of course, is affected by variations within device 1 as is the voltage on resistance 20. The taps on the two resistances may be so adjusted that under normal stand-by conditions the two voltages are equal, no current flows in the instrument 45. If the instrument be a meter, its scale reading may be zero. Any variation in the light transmission property of the liquid, or gas, within vessel 25 causes the voltage on resistance 20 to increase, or decrease, and this variation will be indicated by the meter 45, the index of which may deflect to the right or left. Thus, the meter 45 continuously monitors the light transmission property within the vessel 25.

In many applications the meter preferably is used as a null indicator; that is, the tap on potentiometer 20 is varied until the meter reads zero. Potentiometer 20 may then be calibrated in terms of the quantity being determined.

Alternatively, meter 45 may be replaced by, or have connected in series with it, the input of a self-balancing potentiometer, such as a Brown recorder, in which the resistance 20 comprises the potentiometer to be balanced. In this way, the tap on potentiometer is automatically maintained in such position that the current in the circuit of meter 45 is zero.

Any influences affecting the sensitivity of the photoelectric device, such, for example, as deterioration, fatigue, temperature variations, variations in the power supply 18, etc., affect the potential on resistances 20 and 43 alike. Since these potentials are applied to the instrument 45 in opposed sense, variations therein due to these extraneous effects balance each other and do not affect the indication produced by the meter. Thus, the operation of the system as a device responsive to light conditions within the vessel 25, or within the path of light from source 33 to the cathode 2, is entirely independent of variations in the sensitivity of the device 1.

Fig. 2 shows a modification of my system in which all light falling upon the photoelectric device 1 originates from a single source 52 which may be a lamp energized from a steady unidirectional potential. This light passes through a monochromatic filter 53 and a lens 54 by which it is collimated toward the photoelectric device 1. The column of light, however, is interrupted by a screen 55 having a rectangular opening 56 therein through which a beam 57 of light passes on through a converging lens 58 to the photoelectric device 1.

The screen 55 also has a further opening 59 through which a second beam 63 of light passes through a rotating shutter, or chopper, 62 and the converging lens 58 to the photoelectric device. The chopper 62 comprises a disk rotated about its center by means of an electric motor 64 and having about its periphery rectangular teeth 65 of sufficient length and width and so spaced as to cut off the beam 63 periodically so that the light of beam 63 which falls upon the tube has periodic pulses of about equal duration and with intervals therebetween equal to the duration of the pulses. The opening 59 in shield 55 may be so shaped that the light pulses are of substantially sine wave form so that the light falling upon tube 1 through beam 63 varies in sine wave fashion.

The electrical circuit in which the device 1 is connected may be identical with that shown in Fig. 1. Its output circuit will have an alternating current component produced by light in the beam 63, which component will be transmitted by the transformer 22 to the rectifier 42 where it will be rectified and supplied across resistance 43 as a unidirectional electromotive force, as previously described. Light in the beam 57 may be utilized to effect the desired detection, measuring, or monitoring; for example, the object 66 may be placed in the beam 57 to have its light transmission property, or transparency, measured as was the transmission property of the fluid in vessel 25. Such a body, for example, may comprise a film, or any other body, the light transmission property of which is to be determined.

In both Figs. 1 and 2, it is desirable that the light falling upon the photoelectric cell through both paths shall be light of the same spectral character and, for that reason, the monochromatic filter 53 is employed. In the arrangement of Fig. 2, this filter preferably is placed near the lamp 52 where one such filter affects all of the light. Of course, it could be placed elsewhere in the path of the lamp 52 and the photoelectric cell 1, but in other positions a larger filter would be required, or two like filters, one in each of the two beams. In the arrangement of Fig. 1, two filters are employed, one 35 in the measuring beam and the other 39 in the modulated beam.

Fig. 3 shows a sector of the disk 62 and illustrates somewhat better the relationship between the teeth 65 and the opening 59 in the shield, or screen, 55. It also shows the opening 59 with its lower portion and side walls 67 shaped in sine wave fashion to produce sine wave electromotive force in the output of the photoelectric device.

While I have shown particular embodiments of my invention, it will, of course, be understood that I do not wish to be limited thereto since various modifications, both in the circuit arrangement and instrumentalities emloyed, may be made and I contemplate by the appended claims to cover such modifications as fall within the true spirit and scope of my invention.

What I claim as new and desire to secure by Letters Patent of the United States is:

1. The combination with a photoelectric device having an output circuit, said device being adapted to produce desired current changes in said circuit in accord with light falling on said device and undesired current changes in accord with extraneous effects affecting the sensitivity of said photoelectric device, of means to subject said device simultaneously to light varying in accord with unknown changes to be indicated and to light having predetermined variations, means to separate currents in said output varying in accord with said predetermined variations from current varying in accord with said effects to be determined, a current responsive device, and means to rectify said current having predetermined variations to produce a first potential varying only with said extraneous effects, an impedance, means to pass said current varying in accord with said unknown effects through said impedance to produce thereon a second potential varying with both said unknown changes and said extraneous effects, and means to supply said first and second potentials to said current responsive device in such relative sense that variations in said potentials in accord with said extraneous effects balance each other whereby said device indicates said unknown changes and is unaffected by said extraneous effects.

2. The combination with a photoelectric device having an output circuit, said device being adapted to produce desired current changes in said circuit in accord with light falling on said device and undesired current changes in accord with extraneous effects affecting said device, of means to subject said device simultaneously to light varying in accord with unknown changes to be indicated and to light having predetermined variations, a bridge having two arms, means to apply to one of said arms potential varying in accord with the intensity of variations in said output circuit produced by said predetermined variations and to apply to the other arm potential varying in accord with changes in current in said output circuit produced by unknown changes to be indicated, a current responsive device connected between intermediate points on said two arms whereby changes in said two potentials produced by said extraneous effects produce opposing effects in said current responsive device.

3. The combination with a photoelectric device having an output circuit, said device being adapted to produce desired current changes in said circuit in accord with light falling on said device and undesired current changes in accord wtih extraneous effects, of means to subject said device to light varying in accord with unknown changes to be indicated and simultaneously to light having predetermined variations, an indicating device, and means to apply to said indicating device in opposed sense two electromotive forces each varying in accord with said extraneous effects and one varying in accord with said changes to be indicated, said means including means responsive to said predetermined variations to produce the other of said two electromotive forces whereby said variations produced by said extraneous effects affect oppositely said indicating device and said indicating device responds only to said changes to be indicated.

4. The combination with a photoelectric device, means to project on said device light from a constant source through an object the light transmission property of which is to be determined, of means to project simultaneously on said device light having predetermined variations, an output circuit for said device having current variations therein in accord with said predetermined variations and in accord with said light transmission property to be determined, both said variations being subject to undesired variations resulting from undesired changes in sensitivity of said device, an indicating means, and means to derive from said output circuit current varying in accord with said predetermined variations and to apply to said indicating device unidirectional electromotive force of value dependent on the intensity of said current, means to apply to said indicating device a second unidirectional electromotive force in opposite sense to said first unidirectional electromotive force and varying in accord with said property to be determined whereby said undesired variations in said two unidirectional currents oppose each other as applied to said indicating device.

5. In a photoelectric device, the combination comprising a source of continuously modulated light, a source of substantially constant light, means disposed along the path of said constant light for containing material to be investigated for light transmission property, light sensitive means disposed to receive said modulated light and light passed by said means for producing a composite electrical signal having components proportional to each of said lights and to undesired extraneous effects, bridge circuit means connected to said light sensitive means and having two branches, one of said branches including means eliminating one light proportional signal component, the other of said branches including means eliminating the other light proportional signal component, and indicating means adjustably connected between said two branches whereby only the difference between said two light proportional signal components is indicated.

References Cited in the file of this patent

UNITED STATES PATENTS

| | | |
|---|---|---|
| 1,999,023 | Sharp et al. | Apr. 23, 1935 |
| 2,066,934 | Gulliksen | Jan. 5, 1937 |
| 2,078,645 | Swingle | Apr. 27, 1937 |
| 2,145,591 | FitzGerald | Jan. 31, 1939 |
| 2,241,743 | Schoene | May 13, 1941 |
| 2,420,058 | Sweet | May 6, 1947 |
| 2,559,173 | Shawhan | July 3, 1951 |
| 2,678,581 | Reisner | May 18, 1954 |
| 2,722,156 | Warren | Nov. 1, 1955 |

FOREIGN PATENTS

| | | |
|---|---|---|
| 495,165 | Italy | June 1954 |

OTHER REFERENCES

J. C. Frommer: "A Novel Measuring and Proportioning Method," Instruments, vol. 24; Issue 3; March 1951; pages 286, 321, 322.